United States Patent [19]
Larson

[11] 3,896,677
[45] July 29, 1975

[54] DUAL AMPLITUDE VIBRATION GENERATOR

[75] Inventor: Roger L. Larson, Waconia, Minn.

[73] Assignee: Raygo, Inc., Minneapolis, Minn.

[22] Filed: Jan. 18, 1974

[21] Appl. No.: 434,565

[52] U.S. Cl. ................................................ 74/61
[51] Int. Cl. ............................................ F16h 33/00
[58] Field of Search ................. 74/87, 61; 310/81; 259/1 R; 198/220 DB

[56] References Cited
UNITED STATES PATENTS

| 2,660,067 | 11/1953 | Glover | 74/87 |
| 2,677,967 | 5/1954 | Galbraith | 74/87 |
| 2,861,458 | 11/1958 | Awedissjan | 74/87 |

*Primary Examiner*—Samuel Scott
*Assistant Examiner*—Wesley S. Ratliff, Jr.

[57] ABSTRACT

A vibratory compacting machine having a dual amplitude vibration generator by which either high amplitude or low amplitude vibration is selectively imparted to the drum of the machine. The vibration is produced by primary and secondary eccentric weights carried by a power driven shaft inside the drum. The primary weight is fixed to the shaft and the secondary weight is mounted to swing about an axis parallel to and spaced from the shaft, between a retracted position in which the primary and secondary weights are so disposed with respect to one another that the amplitude of vibration is high, and a projected position in which the secondary weight partially counterbalances the primary weight and the amplitude of vibration is low. Solid rubber torsion springs incorporated in the pivotal connection between the weights yieldingly hold the secondary weight in its retracted high amplitude position from which it is swung by centrifugal force if not positively restrained by the activation of a locking device that includes a manually shiftable control rod axially slidable in the shaft.

10 Claims, 10 Drawing Figures

PATENTED JUL 29 1975 3,896,677

SHEET 1

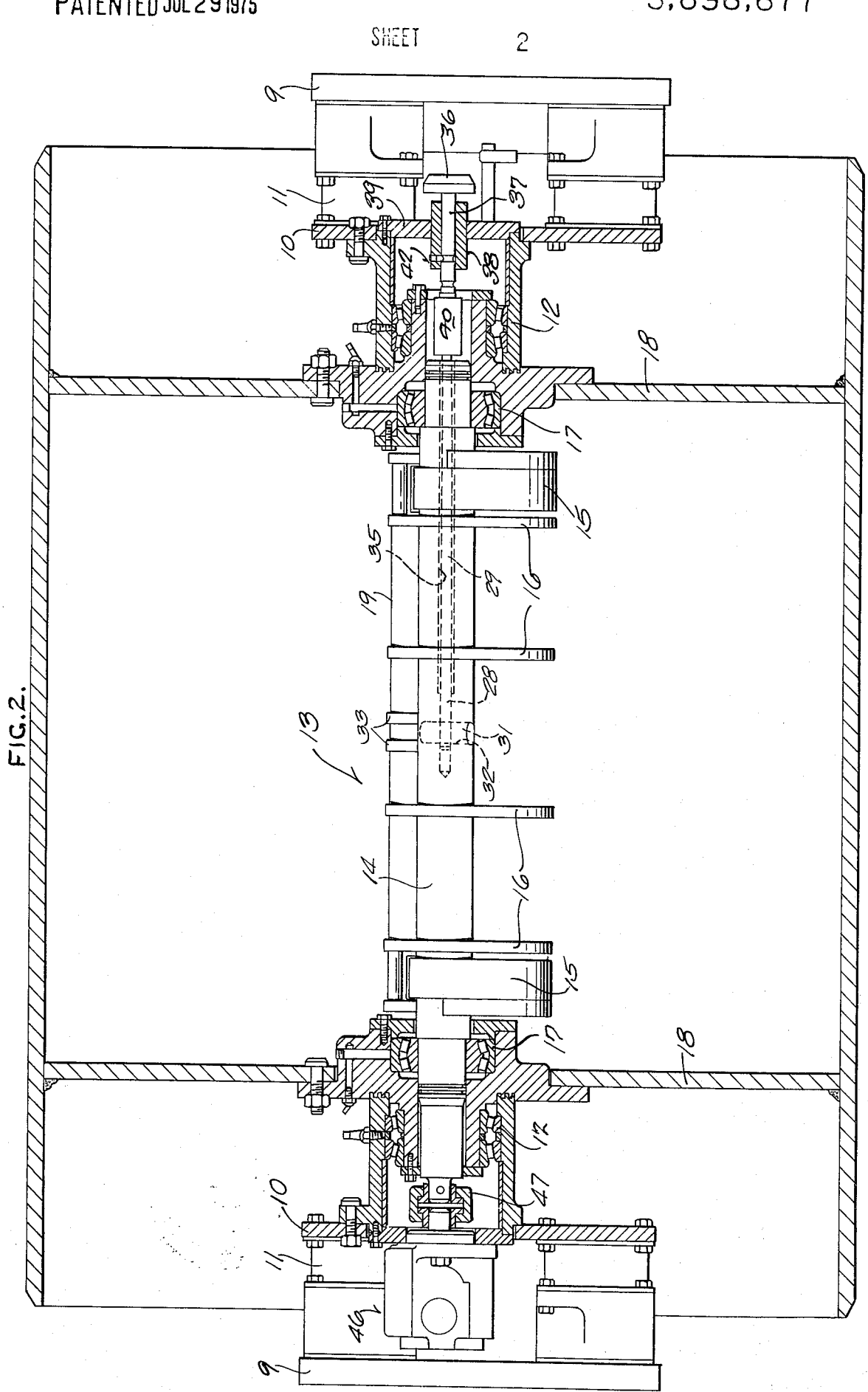

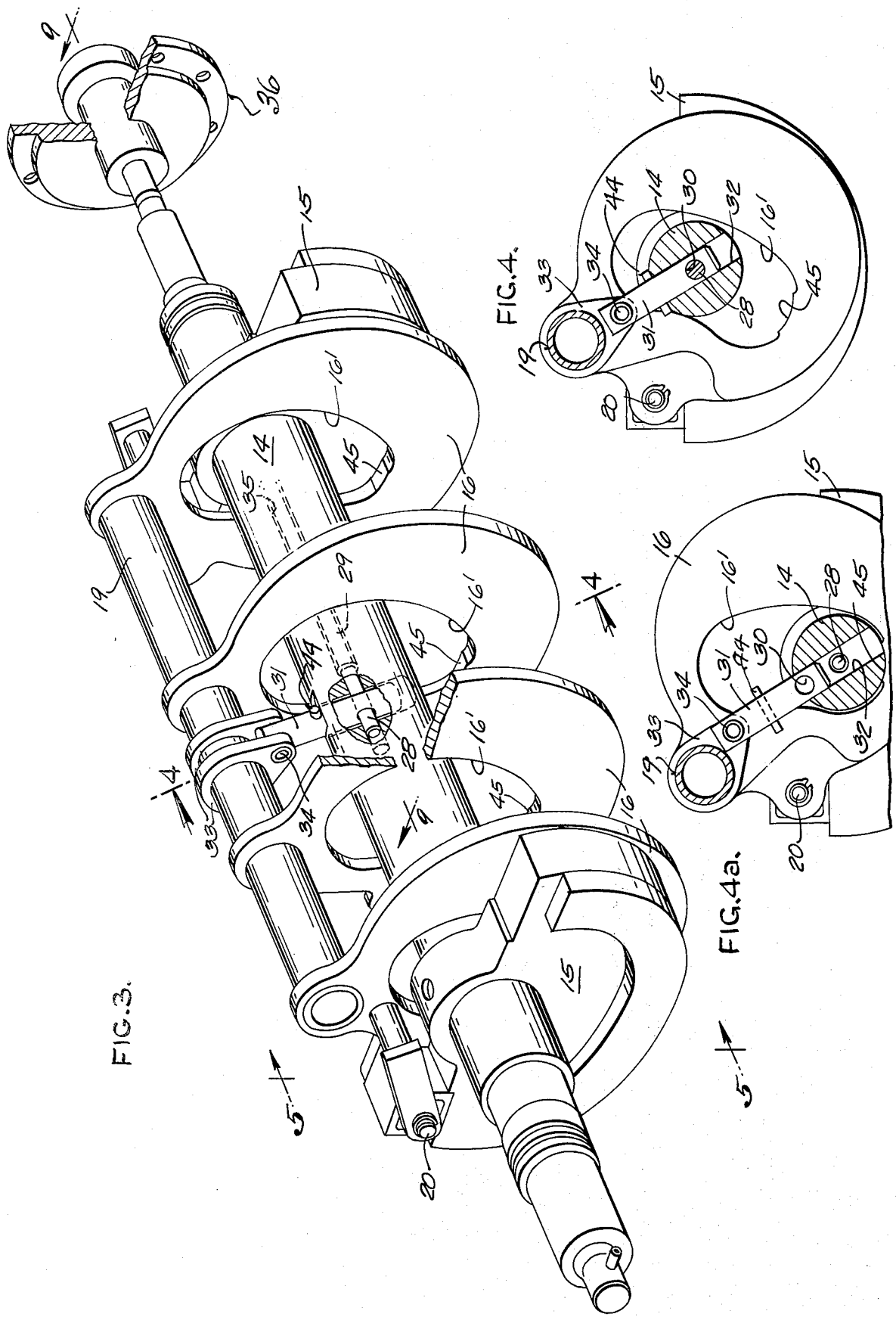

DUAL AMPLITUDE VIBRATION GENERATOR

This invention relates to the production of useful vibration by means of rapidly rotating eccentric masses, and has particular reference to mechanism for selectively imparting either high amplitude or low amplitude vibration to the drum of a vibratory compacting machine. Although such vibration generators have been available for some time, as evidenced by British patents Nos. 766,593 and 769,547, German patent No. 1,255,591 and U.S. Pat. Nos. 3,600,956; 3,656,419 and 3,722,381, and the pending Barrett et al application Ser. No. 290,531, which is assigned to the assignee of this invention, none of the known prior devices was as practical and simple as that of the present invention. This is especially so with respect to the manner in which the primary and secondary eccentric masses are related and arranged to either partially counterbalance each other for low amplitude vibration or coact for high amplitude vibration.

The importance in a vibratory compacting machine of being able to selectively adapt the amplitude of the vibration imparted to its drum to the nature of the surface being compacted is well known and understood; and while the need for correlation in the direction of rotation of the eccentric weights and of the drum as the machine travels over the surface being compacted was taught in the 1967 German patent, and again expounded in the United States Keppler U.S. Pat. No. 3,605,583, the latest issued of the aforementioned patents — namely, the Tuneblom U.S. Pat. No. 3,722,381 — not only evidences no recognition of the need for such correlation, but makes its attainment impossible, since in the vibration generator of that patent, the switch from one amplitude to the other is effected by changing the direction of rotation of the shaft on which the eccentric weights are mounted.

In the present invention, the change in amplitude of vibration is in nowise dependent upon the direction in rotation of the eccentric weights, and is accomplished by strictly mechanical means that lends itself well to implementation by simple, rugged and easily fabricated structure.

With these observations and objectives in mind, the manner in which the invention achieves its purpose will be appreciated from the following description and the accompanying drawings, which examplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 2 is a longitudinal section through the drum of the compacting machine, showing the vibration generator mounted therein;

FIG. 3 is a perspective view of the vibration generator per se;

FIGS. 4 and 4a are cross sectional views through FIG. 3 on the plane of the line 4—4, in the first of which the vibration generator is in its high amplitude mode, while the second shows it in its low amplitude mode;

Figure 1:
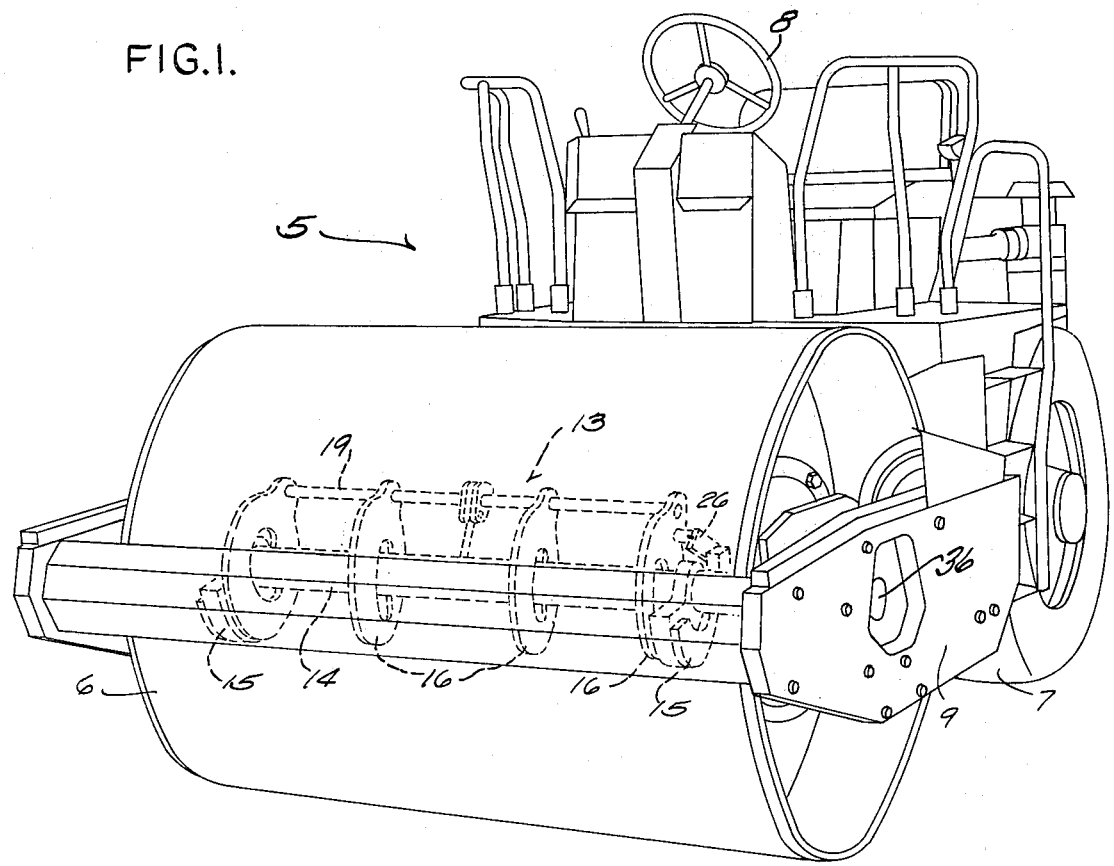
FIG. 1 is a perspective view of a vibratory compacting machine equipped with the vibration generator of this invention.
Figure 5:
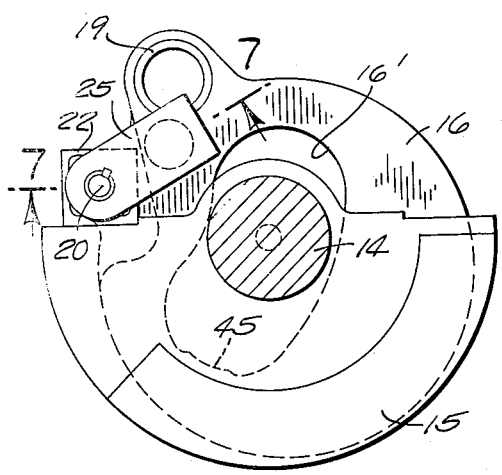
FIGS. 5 and 6 are cross sectional views through FIG. 3 on the plane of the line 5—5, respectively, showing the vibration generator in its high and low amplitude modes.
Figure 6:
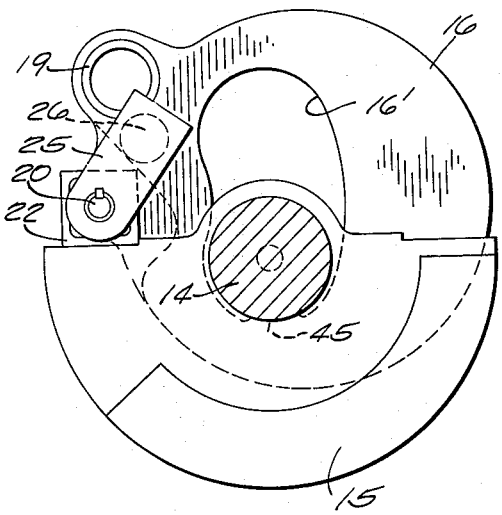

Referring now more particularly to the accompanying drawings, the numeral 5 designates generally a self-propelled compacting machine having a single freely rotatable compacting drum 6 and a pair of power driven traction wheels 7 that are part of a tractor which mounts the power plant of the machine. The machine is steerable as it moves over material to be compacted by reason of the fact that the drum assembly and the tractor are articulately connected for relative motion about an upright axis. A steering wheel 8 enables the operator of the machine to control the mechanism by which steering is effected. Details of the steering mechanism and of the reversible propulsion system, being conventional and well known, are not shown.

As is conventional, the drum assembly of the machine comprises a rigid yoke, the arms 9 of which embrace the drum and have bearing mounting plates 10 connected thereto by elastic shock mounts 11 (see FIG. 2). The bearing mounting plates 10 are adjacent to the ends of the drum and carry the outer races of bearings 12 by which the drum is freely rotatably connected with the mounting plates, and through the shock mounts 11, with the arms 9 of the yoke. Vibration of the drum is therefore not imparted to the rest of the machine.

The drum is hollow and the vibration generator, designated generally by the numeral 13, is housed within the drum and comprises a power driven shaft 14 carrying a pair of primary weights 15 and a plurality of secondary weights 16. The primary weights are semicircular members eccentrically fixed to the shaft, one near each end thereof, and the secondary weights are essentially ring-shaped and encircle the shaft between the primary weights. As will be described later, the way in which the secondary weights are mounted enables them to swing about an axis parallel to the shaft, between a retracted position in which they coact with the primary weights to produce high amplitude vibration and a projected position in which they partially counterbalance the primary weights to bring about low amplitude vibration.

The entire vibration generator rotates about the axis of the drum and, as it does, it imparts either high or low amplitude vibrations to the drum by virtue of the fact that the ends of its shaft 14 are journalled in bearings 17 that are mounted in the end walls 18 of the drum.

The heavy primary weights 15 are, of course, secured to the shaft in phase with one another. The ring-like secondary weights are all fixed to a shaft 19, in phase with each other, and this rigid assembly is connected with the shaft 14 to rotate therewith and also swing or rock about an axis that is fixed with respect to the primary weights and parallel to and spaced from the shaft. The connection between the secondary weight assembly and the shaft is formed by coaxial stub shafts 20 fixed to and projecting from the endmost secondary weights to be received in rubber torsion "springs" 21 that are seated in square housings 22 fixed to the primary weights 15.

Figure 8:
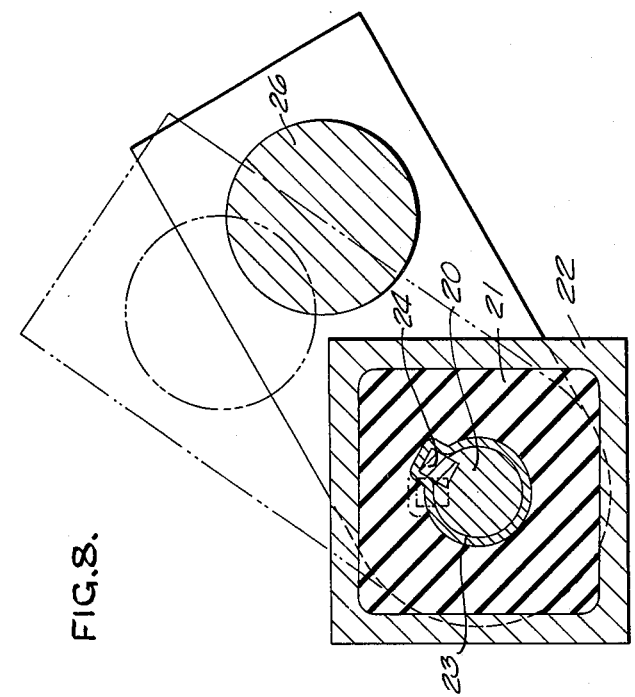
FIG. 8 is a cross sectional view through FIG. 7 on the plane of the line 8—8.
Figure 7:
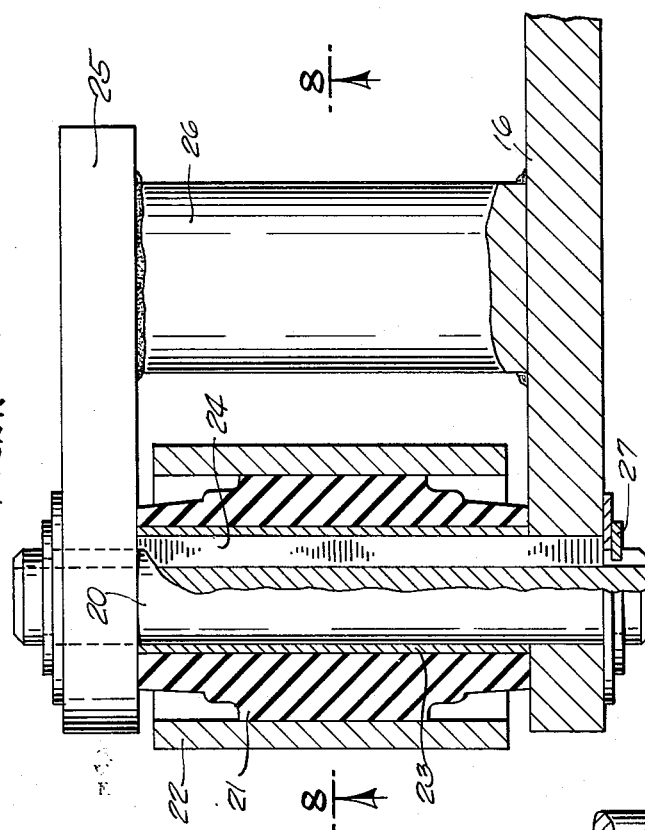
FIG. 7 is a detail sectional view through FIG. 5 on the plane of the line 7—7.

As best seen in FIGS. 7 and 8, the rubber torsion springs 21 have metal sleeves 23 embedded therein and formed to provide keyways for keys 24 by which the stub shafts are secured against rotation with respect to the secondary weight assembly. Since the rubber torsion springs have a square cross section that snugly fits the square housings 22, it follows that swinging or rocking movement of the secondary weight assembly is yieldingly resisted; and, inasmuch as the torsion springs are preloaded during securement of their housings to the primary weights in the direction to yieldingly maintain the secondary weight assembly in its retracted position, the vibration generator will be in its high amplitude mode whenever it is not rotating.

However, upon rotation of the power driven shaft 14 in either direction, above a predetermined speed, centrifugal force acting on the secondary weight assembly will overcome the torsion springs and cause the secondary weight assembly to assume its projected high amplitude position, unless it is positively restrained from doing so.

The manner in which the secondary weight assembly is positively restrained will be described in a moment but, before doing so, attention is directed to the structure at the end of each stub shaft 20, opposite that secured to the adjacent endmost secondary weight. This structure, best seen in FIG. 7, comprises an arm 25 keyed to the stub shaft and rigidly connected with the endmost secondary weight by a crosspiece 26. In this manner, the twisting forces imparted to the rubber torsion springs are uniformly distributed along the length of the stub shafts, and — in addition — securement of the stub shafts against endwise displacement is simplified since it enables the use of conventional C-washers 27 to hold the shafts against shifting axially.

The secondary weight assembly is positively restrained against being swung by centrifugal force to its projected low amplitude position by the insertion of the inner end portion 28 of a control rod 29, into a hole 30 diametrically through one end portion of a pin 31 that is slidably received in a cross bore 32 in the shaft 14 and has its other end portion embraced by a pair of arms 33 projecting from the shaft 19, and pivoted thereto, as at 34. The control rod 29 is shiftable in an axial bore 35 in the shaft 14 between an operative position in which its inner end portion 28 projects through the hole 30 and an inoperative position freeing the secondary weight assembly for response to centrifugal force.

Figure 9:
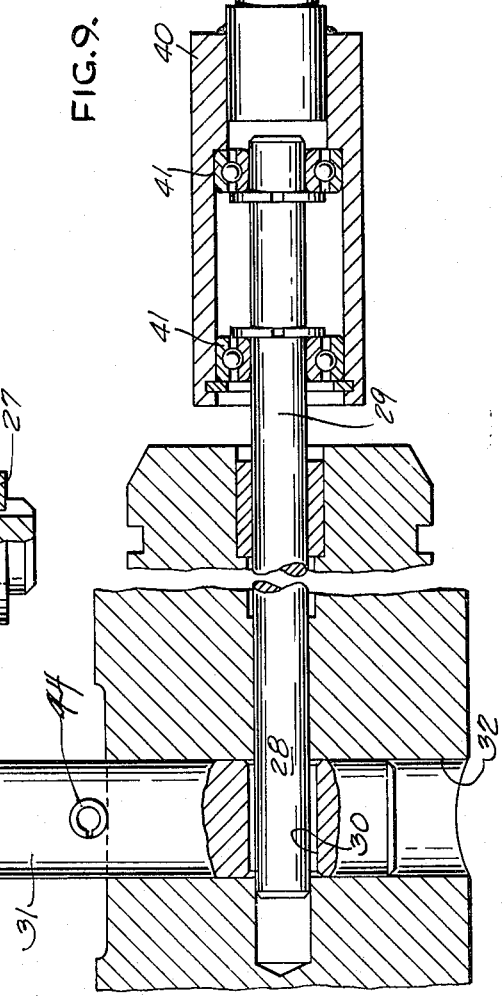
FIG. 9 is a longitudinal sectional view through FIG. 3 taken substantially on the plane of the line 9—9.

Endwise shifting of the control rod may be effected in any desired way, as for instance by means of a remotely controlled pressure fluid motor, but in the illustrated embodiment of the invention it is done by pushing in or pulling out a knob 36 located at one end of the drum. A stem 37 projecting from the knob is slidably received in a bushing 38 carried by a plate 39 which, in turn, is bolted to the adjacent bearing mounting plate 10, and is freely rotatably connected to the control rod in a manner enabling endwise motion to be imparted thereto. As shown in FIG. 9, the connection is formed by a sleeve 40 fixed to and projecting from the stem 37 to receive the adjacent end portion of the control rod. A pair of ball bearings 41 in the bore of the sleeve and encircling the control rod are suitably secured against axial displacement with respect to both the sleeve and the control rod, to provide for the transmission of endwise motion from the knob 36 to the control rod, while leaving the rod free to rotate with respect to the knob.

The two positions of the control rod are defined by a spring pressed detent 42 mounted in the bushing 38 for entry into one or the other of two grooves 43 in the stem 37.

Obviously, for the inner end of the control rod to enter the hole 30 in the pin 31, the pin must be in a position at which its hole 30 is coaxial with the rod, and — for that to be — the limit of the motion imparted to the movable secondary weight assembly by the rubber torsion springs must be accurately defined. The required definition is achieved by the collision of a shoulder on the pin 31 with the side of the shaft 14. This shoulder is conveniently provided by driving a cross pin 44 into a hole drilled through the pin 31 — preferably at a point at which the cross pin engages the side of the shaft 14 — just as the center of the pivotal connection 34 moves into dead center relation with the axes of the shafts 14 and 19 (see FIG. 4).

To assure against any interference with the described limitation of the torsion spring-produced retraction of the movable secondary weights, their holes 16' are of such size and shape that the edges of the holes are well spaced from the shaft 14 when the device is in its high amplitude mode.

The low amplitude position of the movable secondary weight assembly is defined by the collision of a pad 45 on the edge of the hole 16' in each of the ring shaped weights with the shaft 14, as shown in FIG. 4a. Note that in this position of the assembly, a substantial length of the pin 31 is still in the cross bore 32.

Rotation is imparted to the shaft 14, and hence to the entire vibration generator, by a hydraulic motor 46 that is mounted on the bearing mounting plate 10 at the end of the drum opposite the end thereof at which the control knob 36 is located, the drive shaft of the motor being connected with the shaft 14 through a suitable coupling 47.

The drive motor 46 is reversible by the operator of the machine by manipulation of control mechanism, not shown, so that the direction in which the vibration generator rotates can be correlated with the direction of travel of the machine. As explained in the aforesaid German patent No. 1,255,591 and in the later U.S. Pat. No. 3,605,583, such correlation is an important matter from the standpoint of securing a smooth surface, especially where the surface being compacted is asphalt. Unless such correlation is possible, the influence of the rotating weights upon rotation of the drum will result in interference with smooth, steady rolling engagement between the drum and the surface being compacted as the machine travels in one direction. To avoid that objectionable condition, the direction of rotation of the vibration generator must be reversed.

From the foregoing description taken with the accompanying drawings, it will be evident that the vibration generator of this invention is distinguished by simplicity in design and construction and hence is well adapted to use in vibratory compacting machines. Among the significant features of the invention, the construction and mounting of the movable secondary eccentric weight assembly is perhaps the most outstanding. Having the secondary weights tied together into a unitary rigid assembly and connecting that assembly with the primary weights for swinging or rocking movement about an axis spaced from the axis about which the entire structure rotates, made it feasible to employ simple rubber torsion springs to automatically bring the movable secondary weight assembly to its retracted high amplitude position whenever the vibration generator stops rotating.

The manner in which the secondary weight assembly is releasably "locked" in its retracted position by simply shifting the control rod to its operative position, and the fact that — when unlocked — the secondary weights are swung to their projected low amplitude position by centrifugal force — regardless of the direction of rotation of the vibration generator — are also distinctively advantageous features of the invention. Finally, the reversibility in direction of rotation of the vibration generator and the fact that the speed of its driving motor is readily adjustable, enables the effect of the rotating masses upon rotation of the drum, and the frequency of the resulting vibration to be correlated with the nature of the surface being compacted.

Those skilled in the art will appreciate that the invention can be embodied in forms other than as herein disclosed for purposes of illustration.

The invention is defined by the following claims.

I claim:

1. A dual amplitude vibration generator operable to produce vibration in either a high or a low amplitude mode, comprising:
    A. a power driven shaft;
    B. a primary weight fixed with respect to the shaft to rotate therewith, with its center of gravity eccentric to the axis of the shaft;
    C. a secondary weight;
    D. means connecting the secondary weight with the shaft for rotation therewith and for free swinging motion about an axis fixed with respect to and parallel with the shaft, between defined high and low amplitude positions, in the first of which its center of gravity is so located with respect to that of the primary weight that the vibration resulting from its rotation with the shaft augments the vibration produced by the primary weight and in the second of which it partially counterbalances the primary weight,
        the freedom of the secondary weight to swing about said axis making it responsive to centrifugal force and enabling centrifugal force to move it from its high amplitude position to its low amplitude position except when restrained against such movement; and
    E. means for releasably restraining the secondary weight against response to centrifugal force and thereby causing the vibration generator to operate in its high amplitude mode, said means comprising
        1. an axially shiftable control rod carried by the power shaft and constrained to axial movement with respect thereto between operative and inoperative positions; and
        2. means operative when the control rod is in its operative position but not when it is in its inoperative position, to connect the control rod with the secondary weight and by such connection hold the secondary weight in its high amplitude position despite centrifugal force acting thereon, whereby upon shifting of the control rod to its inoperative position the secondary weight is free to respond to centrifugal force and assume its low amplitude position.

2. The invention defined by claim 1, further characterized by resilient biasing means reacting between the primary and secondary weights and tending at all times to hold the secondary weight in its high amplitude position,
    so that upon cessation of rotation of the power driven shaft, the secondary weight is returned to its high amplitude position, if during such rotation the secondary weight had been moved by centrifugal force to its low amplitude position.

3. The invention defined by claim 1, further characterized in that the means for connecting the secondary weight with the shaft comprises
    pivot means, the axis of which is radially spaced from and parallel to the axis of the shaft, so that said secondary weight swings in an arc as it moves between its high amplitude and low amplitude positions.

4. The invention defined by claim 3, wherein said pivot means has incorporated therein the resilient biasing means of claim 2.

5. The invention defined by claim 4, wherein said resilient biasing means is a body of elastic material mounted on the primary weight and having embedded therein and non-rotatably fixed thereto a shaft that has a non-rotatable connection with the secondary weight and the axis of which is that of said pivot means.

6. The invention defined by claim 1, wherein the primary weight is substantially entirely at one side of the axis of the power driven shaft,
    wherein said means connecting the secondary weight with the shaft comprises pivot means fixed to the primary weight at a distance radially spaced from the axis of the shaft and operatively connected with the secondary weight to constrain the latter to arcuate swinging motion between its high amplitude and low amplitude positions, and
    wherein the secondary weight is shaped to embrace the shaft in all positions thereof.

7. The invention defined by claim 6, wherein the low amplitude position of the secondary weight is defined by engagement of a surface thereof with the shaft.

8. The invention defined by claim 6, wherein said control rod slides in an axial bore in the shaft,
    and wherein said means connecting the control rod with the secondary weight comprises a pin pivotally connected at one end to the secondary weight at a point spaced from the axis about which it swings and having its opposite end portion slidably received in a cross bore in the shaft that intersects the axial bore in the shaft,
    said pin having a hole which aligns with the axial bore in the shaft when the secondary weight is in its high amplitude position to enable the control rod to be inserted into said hole.

9. The invention defined by claim 8, further characterized by
    abutment means on the pin engageable with the side of the shaft to limit inward movement of the pin into the cross bore and thereby accurately align the hole in the pin with the axial bore in the shaft.

10. The invention defined by claim 1, wherein said primary weight comprises two eccentric masses fixed to the shaft, one near each end thereof, with their centers of gravity in phase, wherein said secondary weight comprises a plurality of substantially identical mass elements shaped to embrace the shaft arranged in spaced apart relation along the length of the shaft between said two eccentric masses and rigidly connected with one another, with their centers of gravity in phase; and wherein said means connecting said secondary weight with the shaft comprises coaxial pivot means connecting said eccentric masses with the endmost of said plurality of substantially identical mass elements, the common axis of said pivot means being spaced radially from the axis of the shaft.

* * * * *

UNITED STATES PATENT OFFICE
CERTIFICATE OF CORRECTION

Patent No.   3,896,677           Dated   July 29, 1975

Inventor(s)   ROGER L. LARSON

It is certified that error appears in the above-identified patent and that said Letters Patent are hereby corrected as shown below:

Col. 1:        Line 46, "examplify" should read

--exemplify--

Col. 3:        Line 21, "high" should read --low--

Signed and Sealed this

*Sixth* Day of *September 1977*

[SEAL]

*Attest:*

RUTH C. MASON           LUTRELLE F. PARKER
*Attesting Officer*      *Acting Commissioner of Patents and Trademarks*